United States Patent [19]

Matsumoto et al.

[11] Patent Number: 5,734,499
[45] Date of Patent: Mar. 31, 1998

[54] INTERPUPILLARY DISTANCE ADJUSTING MECHANISM FOR USE IN BINOCULAR TELESCOPE

[75] Inventors: Yoshihiro Matsumoto, Inagi; Fumio Tomikawa, Chofu, both of Japan

[73] Assignee: Olympus Optical Co., Ltd., Tokyo, Japan

[21] Appl. No.: 510,918

[22] Filed: Aug. 3, 1995

[30] Foreign Application Priority Data

Aug. 4, 1994 [JP] Japan .................... 6-183654

[51] Int. Cl.$^6$ ........................... G02B 23/00
[52] U.S. Cl. .............. 359/417; 359/407; 359/412; 359/414
[58] Field of Search ................. 359/399, 407, 359/409, 411–418, 480–482

[56] References Cited

U.S. PATENT DOCUMENTS

| | | | |
|---|---|---|---|
| 4,449,787 | 5/1984 | Burbo et al. | 359/411 |
| 5,335,110 | 8/1994 | Shin | 359/480 |
| 5,381,263 | 1/1995 | Nowak et al. | 359/411 |

FOREIGN PATENT DOCUMENTS

| | | | |
|---|---|---|---|
| 55-161205 | 12/1980 | Japan . | |
| 3-36974 | 6/1981 | Japan . | |
| 61-251814 | 11/1986 | Japan | 359/418 |

OTHER PUBLICATIONS

English Abstract of the Japanese reference No. 55–161205.

*Primary Examiner*—Thong Nguyen
*Attorney, Agent, or Firm*—Louis Weinstein

[57] ABSTRACT

An interpupillary distance adjusting mechanism for use in a binocular telescope, having a pair of lens-barrels which contain lens optical systems, respectively, and are placed in parallel with each other. The interpupillary distance adjusting mechanism further has first and second guide shafts, which slidably guide the pair of lens-barrels in a direction substantially perpendicular to the direction of the optical axes of the lens optical systems, interpupillary distance adjusting springs for pushing the pair of lens-barrels in a sliding direction, and an interpupillary distance adjusting cam which can adjust an interpupillary distance by sliding the pair of lens-barrels along the guide shafts as the result of undergoing a pushing force from the interpupillary distance adjusting spring, of converting a part of the pushing force in a direction which intersects the sliding direction, and of moving the pair of lens-barrels by pushing the pair of lens-barrels against the first guide.

38 Claims, 11 Drawing Sheets

INTERPUPILLARY DISTANCE ADJUSTING MECHANISM FOR USE IN BINOCULAR TELESCOPE

BACKGROUND OF THE INVENTION

1. Field of the Invention

The present invention generally relates to an interpupillary distance adjusting mechanism for use in a binocular telescope and more particularly relates to an interpupillary distance adjusting mechanism of a binocular telescope, which is used for adjusting the distance between a pair of lens-barrels thereof.

2. Description of The Related Art

As is well known, the distance between the eyes of a person, namely, the interpupillary distance varies with individual variations in age, sex and so on. Therefore, binoculars require a mechanism for adjusting the distance between a pair of left and right lens-barrels, in order to adapt themselves to users of various interpupillary distances.

Among such interpupillary distance adjusting mechanisms, hitherto, there have been proposed various kinds of technical means of the type that adjust the interpupillary distance by moving a pair of left and right lens-barrels of a binocular telescope in parallel with each other.

As an example of such technical means, for example, the Japanese Patent Publication No. 46407/1985 Official Gazette describes a mechanism having a housing serving as an armoring member, in which a pair of left and right lens-barrels are incorporated. A pair of front and rear guide rails (incidentally, dovetail grooves, in this case) extending in a direction perpendicular to the optical axis of each binocular lens are disposed in the housing. At least one of the lens-barrels is movably mounted upon the guide rail. Further, a pair of front and rear driving rods for adjusting the interpupillary distance, each of which is provided in parallel with this guide rail and has left and right end threaded portions, are screwed to the lens-barrel mounted onto this guide rail. Moreover, eye-piece adjusting portions are connected with each other through a sleeve and a bush rod.

The mechanism described in the Japanese Patent Publication No. 46407/1985 Official Gazette, however, is not provided with means for preventing a backlash from being produced between the lens-barrel and the guide rail and in a screw fitting portion. Therefore, the deviation from the parallelism between the optical axes of the binoculars occurring owing to this backlash may increase at the time of moving the left and right lens-barrels. Further, when the armoring member becomes deformed, parallelism between the front and rear guide rails comes is not able to be maintained. Namely, the parallelism between the optical axes of lens optical systems incorporated in the left and right lens-barrels can not be maintained.

Moreover, as another example of a conventional binocular telescope capable of adjusting interpupillary distance, Japanese Utility Model Publication No. 36974/1991 Official Gazette describes a binocular telescope mechanism having a housing in which a pair of left and right lens-barrels are laterally movably incorporated. Moreover, an operating member for adjusting the interpupillary distance is rotatably supported on a shaft in the central portion of the housing. Furthermore, an interpupillary distance slide cam plate is installed from each of the lens-barrels toward the center of the housing. In addition, a pin provided on a plane of rotation of the operating member and a tip of the slide cam plate are pushed by a spring in such a manner as to always be in abutting engagement with each other.

In the case of the mechanism described in the Japanese Utility Model Publication No. 36974/1991 Official Gazette, as the pupillary distance changes, the direction, in which the spring extends, varies. Thus, the direction, in which the spring pushes, also changes. As a result, backlash can not be produced in a fixed direction. Consequently, there is a possibility that the backlash may affect the parallelism between the optical axes of the left and right lens optical systems.

Generally, it is most important for adjusting the interpupillary distance that even when the distance so between the lens optical systems respectively incorporated in the pair of left and right lens-barrels (namely, the interpupillary distance) changes, the optical axes of these lens optical systems are kept parallel with each other.

In the Japanese industrial standards (JIS), a part of standards "B 7121-1993", which concern a binocular, stipulate that the binocular has an adjustable interpupillary-distance range of at least 60 to 70 mm and that in the case where the interpupillary distance is within this range, an allowable deviation from parallelism between left and right optical axes is within several minutes.

The binocular, however, comes to have some clearance between a lens-barrel, which contains a lens optical system having some weight, and a guide shaft or spindle for guiding this lens-barrel, so as to facilitate the movement of the lens-barrel and change the interpupillary distance thereof freely.

The presence of such clearance, however, disables the binocular from holding the lens-barrel perpendicular to the guide shaft at the time of adjusting the interpupillary distance or of using the binocular normally. Consequently, the conventional binocular has a problem in that the ..cal axis of the lens optical system may change.

OBJECTS AND SUMMARY OF THE INVENTION

Accordingly, a first object of the present invention is to provide a binocular telescope by which an object can be easily seen.

A second object of the present invention is to provide a binocular telescope by which an object can be easily seen without losing parallelism between the optical axes of a pair of optical systems.

A third object of the present invention is to provide a binocular telescope by which an object can be easily seen without losing the parallelism between the optical axes of a pair of optical systems even if the distance between a pair of lens-barrels is adjusted.

A fourth object of the present invention is to provide a small-size binocular telescope by which an object can be easily seen.

A fifth object of the present invention is to provide an interpupillary distance adjusting mechanism for use in a binocular telescope by which an object can be easily seen without losing the parallelism between the optical axes of a pair of optical systems.

A sixth object of the present invention is to provide an interpupillary distance adjusting mechanism for use in a small-size binocular telescope by which parallelism between the optical axes of lens optical systems is not lost, namely, is maintained when a pair of lens-barrels are guided in a direction substantially vertical to the direction of the optical axes of the lens systems.

A seventh object of the present invention is to provide a binocular telescope in which a pair of lens-barrels are not deformed even when undergoing a pushing force exerted by pushing means thereon.

To be brief, in accordance with the present invention, there is provided an interpupillary distance adjusting mechanism for use in a binocular telescope, which comprises a pair of lens-barrels disposed in parallel with each other, guide means for guiding the pair of lens-barrels in directions in which the pair of lens-barrels come away from or nearer to each other, pushing means for pushing the pair of lens-barrels in the direction in which the lens-barrels are guided by the guide means, and interpupillary distance adjusting means for pressing the pair of lens-barrels against the guide means by converting at least a part of a pushing force exerted by the pushing means and simultaneously moving the pair of lens-barrels along the guide means.

The above, as well as other features, objects and advantages of the present invention will become apparent from the following description of a preferred embodiment with reference to the drawings in which like reference characters designate like or corresponding parts throughout several views.

DETAILED DESCRIPTION OF THE PREFERRED EMBODIMENT

Hereinafter, the preferred embodiment of the present invention will be described in detail by referring to the accompanying drawings.

Figure 1:
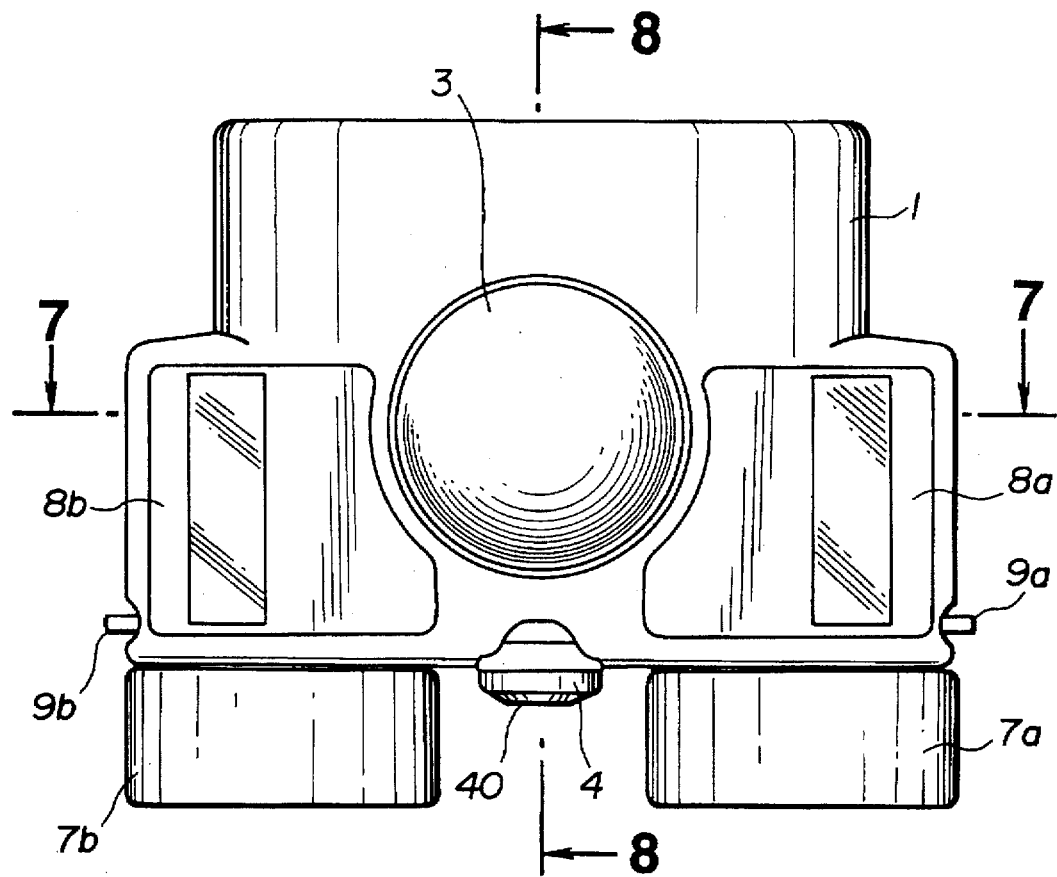
FIG. 1 is a plan view of a binocular telescope embodying the present invention.
Figure 2:
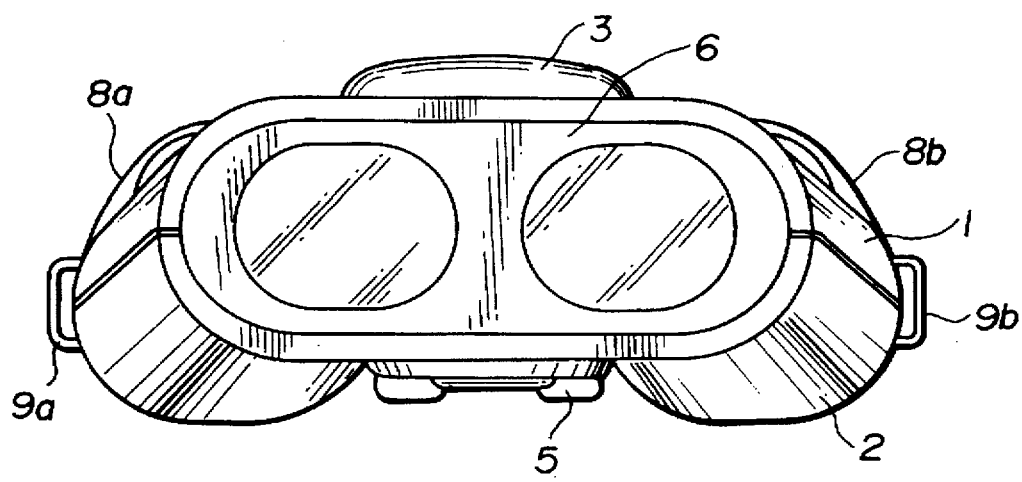
FIG. 2 is a front view of the binocular telescope embodying the present invention.
Figure 3:
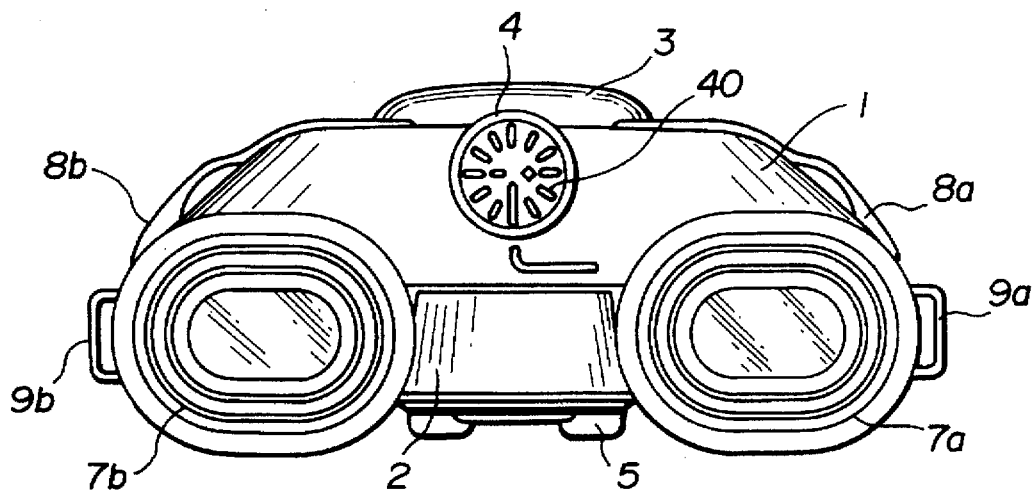
FIG. 3 is a rear view of the binocular telescope embodying the present invention.
Figure 4:
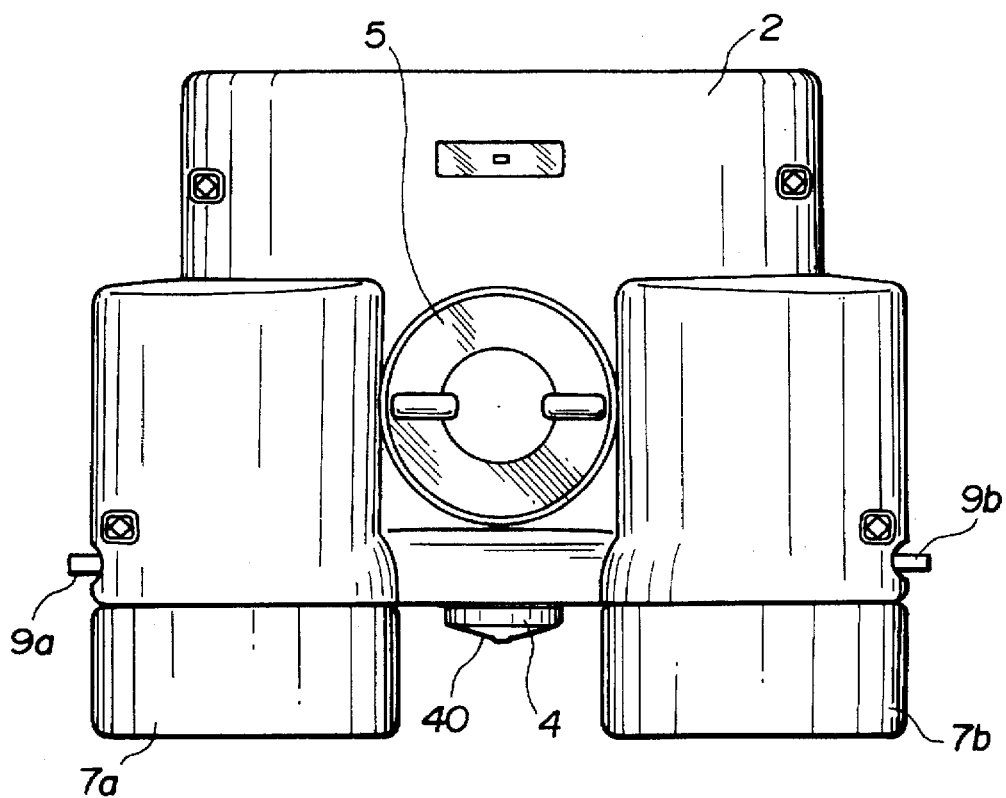
FIG. 4 is a bottom view of the binocular telescope embodying the present invention.
Figure 5:
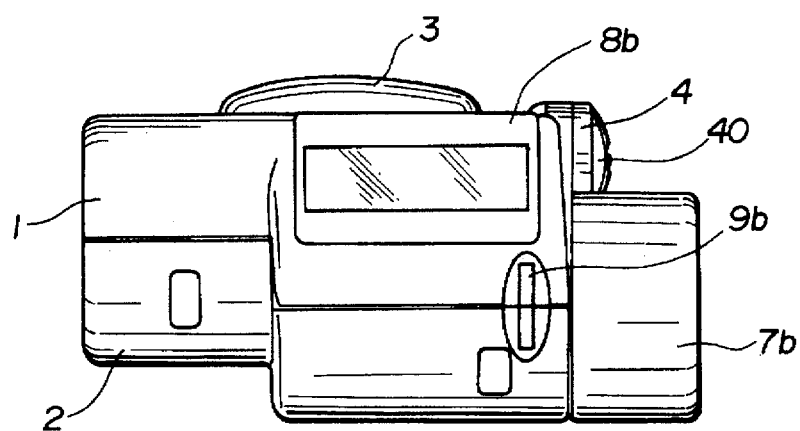
FIG. 5 is a side view of the binocular telescope embodying the present invention.

FIGS. 1 to 14 illustrate an embodiment of the present invention. FIG. 1 is a plan view of a binocular telescope embodying the present invention, namely, this embodiment of the present invention. FIG. 2 is a front view of this binocular telescope viewed from the objective lens side thereof. FIG. 3 is a rear view of this binocular telescope viewed from a direction opposite to the direction in the case of FIG. 2, namely, viewed from the eye-piece side thereof. FIG. 4 is a bottom view of this binocular telescope. FIG. 5 is a side view of this binocular telescope.

This binocular telescope has upper and lower half parts respectively covered with an upper cover 1 and a lower cover 2 which compose a housing of the binocular telescope.

The upper cover 1 has a nearly disk-like distance adjusting knob 3 serving as a focusing adjustment mechanism operating member provided in the nearly central portion thereof. Further, for the purpose of improving the portability and the ability to hold the binocular telescope, grip rubbers 8a and 8b made of rubber are provided on both the left and right sides of the distance adjusting knob 3.

Further, a diopter knob 4 serving as a rotary type operating member for adjusting the diopter is attached to the eye-piece side face of the upper cover 1 in such a manner as to project therefrom. Moreover, a calibrated diopter cover 40 is mounted on an eye-piece-side end face of a diopter knob 4.

Furthermore, an interpupillary distance adjusting knob 5 serving as a rotary operating member for adjusting the interpupillary distance is attached to the nearly central portion of the bottom face of the lower cover 2.

Further, a front cover 6 consisting of a transparent protective member is attached to the objective-lens side face of the binocular telescope so as to prevent a foreign substance or the like from entering into the inside of the binocular telescope.

On the other hand, eye-piece rubbers 7a and 7b, each of which is made of rubber and is shaped into a cylinder having a nearly elliptical section, are attached to the eye-piece side face of the binocular telescope.

Moreover, suspending rings 9a and 9b, to which a strap is attached, are fitted to the side portions of the binocular telescope, which are juncture portions between the upper cover 1 and the lower cover 2.

Figure 6:
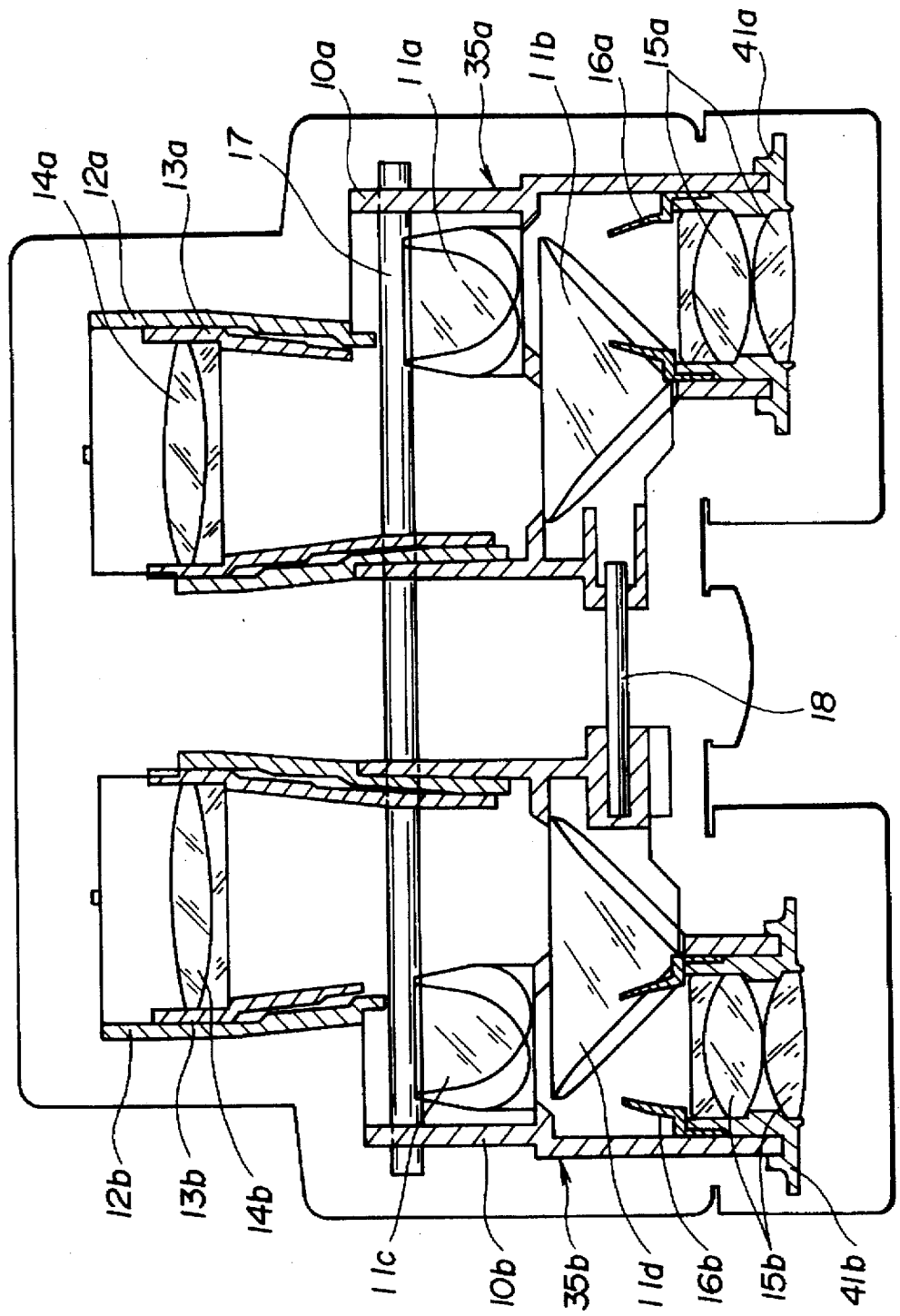
FIG. 6 is a schematically sectional plan view of optical systems of the binocular telescope embodying the present invention.

The configuration of the optical systems of the binocular telescope having the aforementioned appearance is schematically illustrated in FIG. 6.

The lens-barrels for holding the optical systems are a pair of left and right lens-barrels 35a and 35b viewed looking toward the objective lens portions 12a, 12b made of a metal, a resin and the like. Each of the lens-barrels 35a and 35b consists mainly of a lens-barrel objective portion 12a or 12b, a lens-barrel body portion 10a or 10b and a lens-barrel eye-piece portion.

Among these portions, the lens-barrel body portions 10a and 10b hold a pair of prisms 11a and 11b and another pair of prisms 11c and 11d therein, respectively.

The lens-barrel objective portions 12a and 12b are fixed to the front parts of the lens-barrel body portions 10a and 10b by being glued thereto, respectively. Further, objective lens frames 13a and 13b are fitted to the inner surface parts of the lens-barrel portions 12a and 12b holding objective (compound) lenses 14a and 14b, each of which consists of a plurality of lenses, in such a manner as to be able to slide in the direction of the optical axis with the intention of performing a focusing adjustment operation and a diopter movement or adjustment.

Moreover, eye-piece lens frames 41a and 41b serving as lens-barrel piece portions are fastened to the rear parts of the lens-barrel body portions 10a and 10b with screws, respectively. Eye-piece (compound) lenses 15a and 15b, each of which consists of a plurality of lenses, are held on the inner surfaces of the eye-piece lens frames 41a and 41b. Furthermore, field stops 16a and 16b are also attached to the objective-lens side parts of the eye-piece lens frames 41a and 41b, respectively.

Two lens-barrels 35a and 35b, which are a pair of left and right lens-barrels as described above, are suspended by two guide shafts, namely, a relatively long first guide shaft 17 serving as a guide member and a relatively short second guide shaft 18 also serving as a guide member, in such a manner as to be slidably guided.

Figure 7:
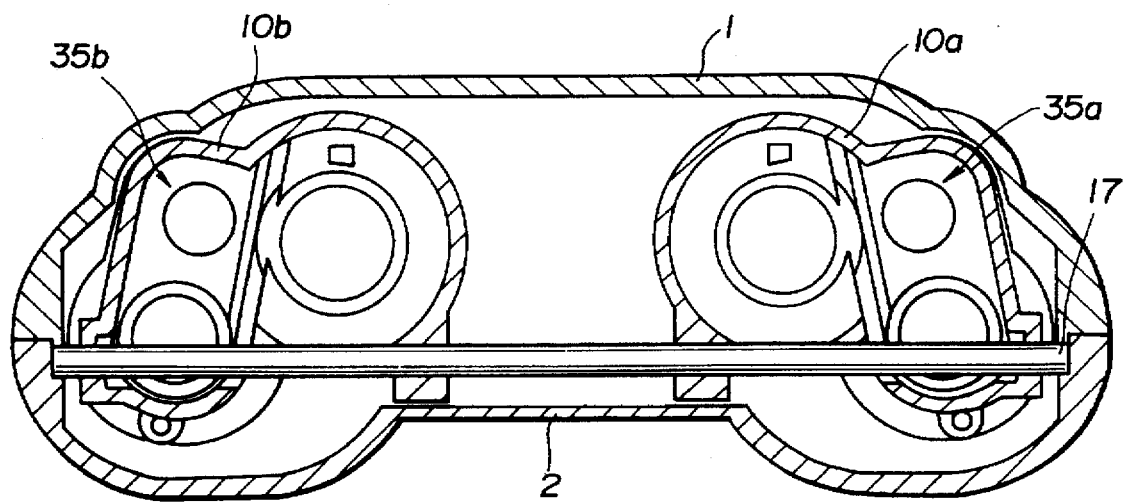
FIG. 7 is a sectional view taken on line 7—7 of FIG. 1.

The first guide shaft 17 is fixed to the binocular telescope by putting both ends thereof between the upper cover 1 and the lower cover 2 as illustrated in FIG. 7 which is a sectional view taken on line 7—7 of FIG. 1.

Figure 9:
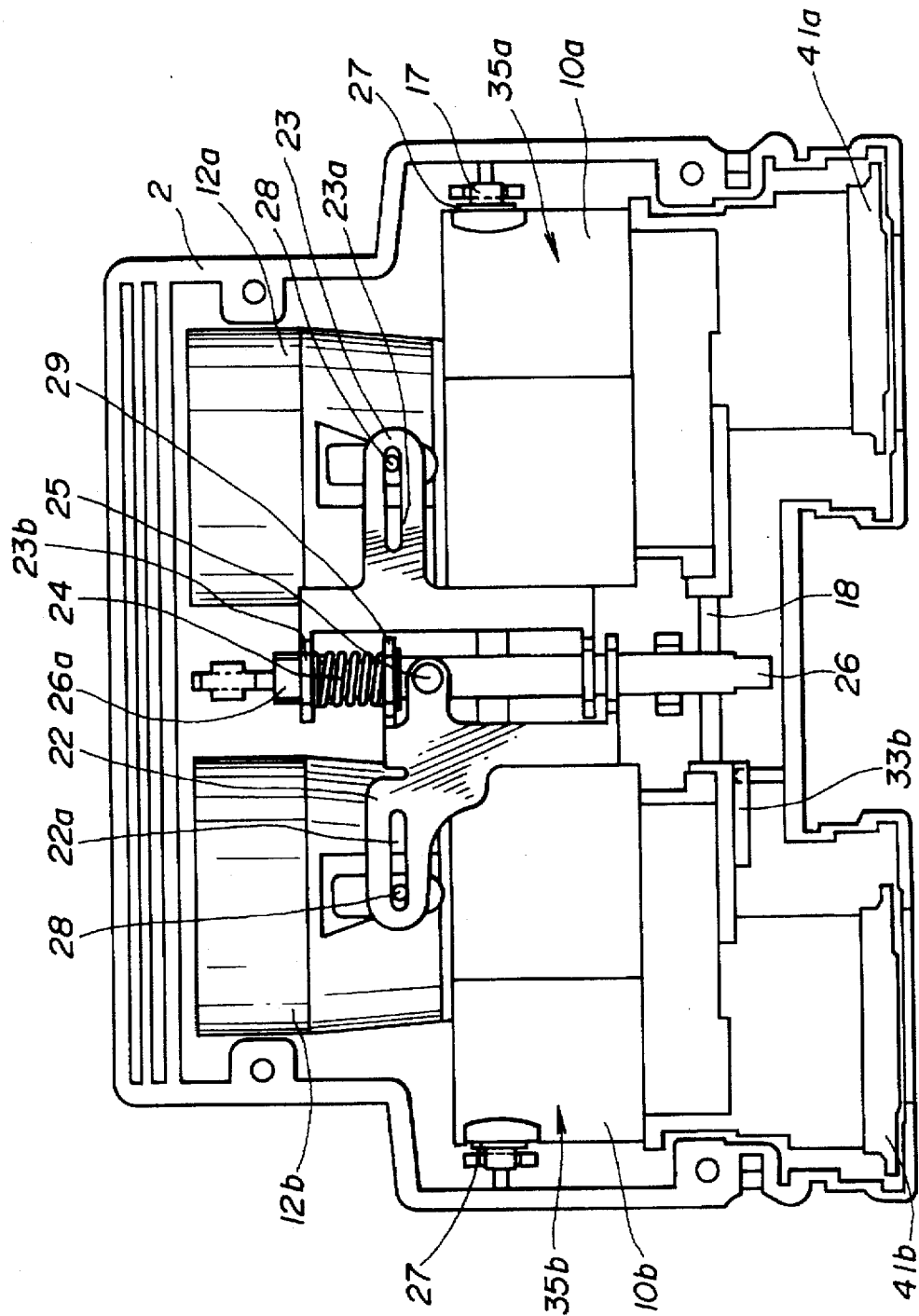
FIG. 9 is a plan view of an internal structure of the binocular telescope, which is shown by removing an upper cover serving as an armoring member thereof.

This first guide shaft 17 is fitted vertically to the lens-barrel body portions 10a and 10b, each of which comprises a part of the corresponding one of the lens-barrels 35a and 35b through a sleeve 27 (see FIG. 9 and so on). The lens-barrel body portions 10a and 10b are provided in such a manner as to be able to freely move along the first guide shaft 17 in a direction perpendicular to the optical axes.

Moreover, the second guide shaft 18 has a right end portion glued and fixed to the lens-barrel body portion 10b and further has a left end portion slidably fitted into the lens-barrel body portion 10a the left-and right-end portions being viewed looking toward the objective.

As described above, the first guide shaft 17 is placed in such a manner as to be perpendicular to the optical axes of the lens-barrels 35a and 35b. The position of the second guide shaft 18 is adjusted in such a manner that the shaft 18 becomes parallel to the first guide shaft 17.

Thus the left and right lens-barrels 35a and 35b are configured in such a manner as to move apart from or nearer to each other along the first and second guide shafts 17 and 18 when performing an interpupillary distance adjustment (to be described later).

Figure 8:
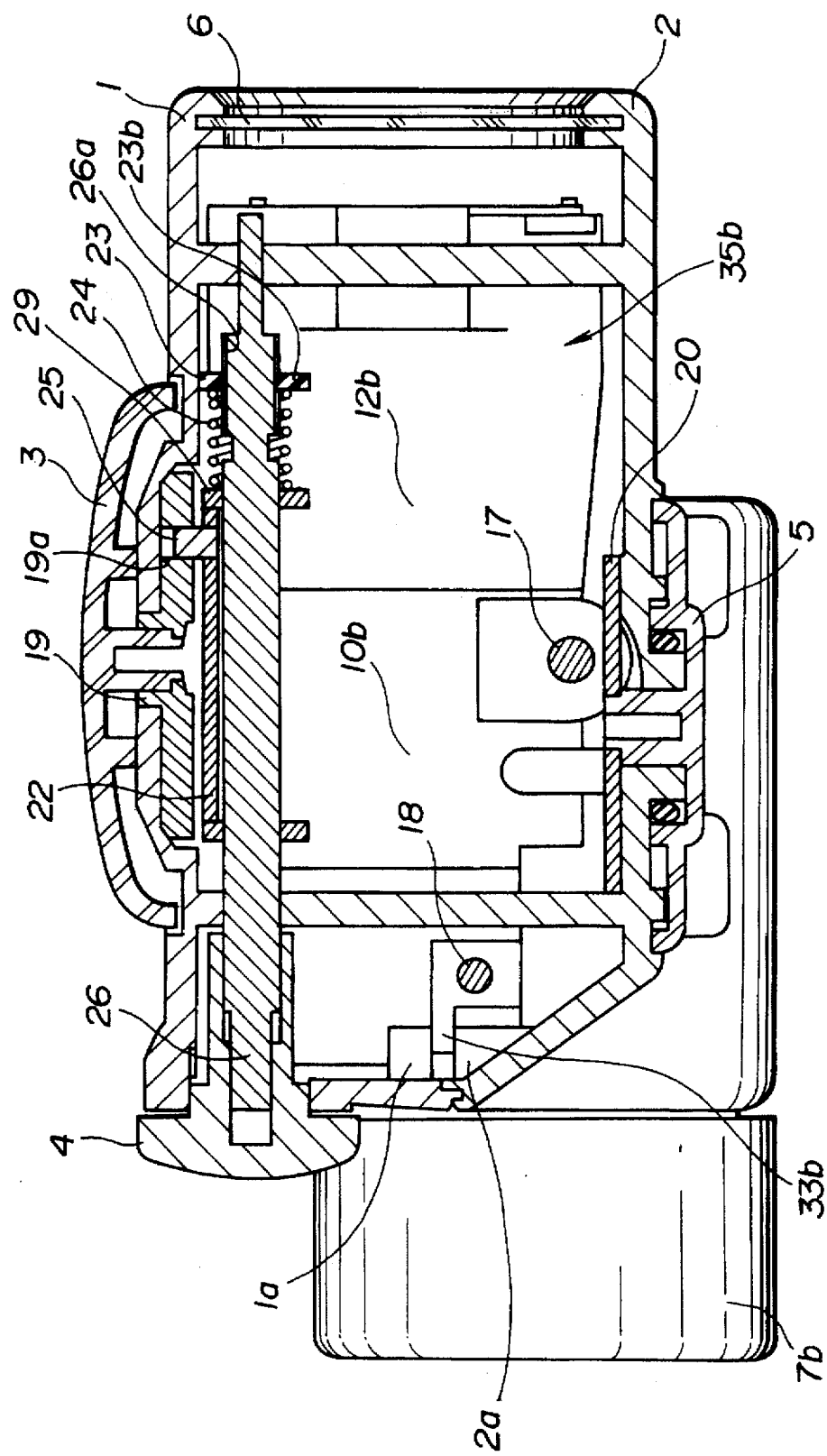
FIG. 8 is a sectional view taken on line 8—8 of FIG. 1.

Further, as illustrated in FIG. 8, a projection portion 33b protruded from the lens-barrel body portion 10b fits into a groove portion formed between a projection portion 1a provided in the upper cover 1 and another projection portion 2a provided in the lower cover 2 (see FIG. 9). Thereby, the rotation of the lens-barrels 35a and 35b around the first guide shaft 17 is restricted to a minimum limit.

Thus, the position of the lens-barrels 35a and 35b are fixed by a three-point support or suspension.

Next, FIGS. 8 and 9 are diagrams for illustrating the configurations of a diopter adjusting mechanism and a focusing adjustment mechanism. FIG. 8 is a sectional view taken on line 8—8 of FIG. 1. FIG. 9 is a plan view of the internal structure of the binocular telescope, which is shown by removing the upper cover 1 serving as an armoring member thereof.

In the case of this binocular telescope, the diopter movement or adjustment and the focusing adjustment are performed by letting out or in the objective lenses 14a and 14b. Namely, a mechanism for letting out the objective lenses 14a and 14b is divided into two mechanisms, namely, a diopter adjusting mechanism and a focusing adjustment mechanism.

First, one of these mechanisms, namely, the diopter adjusting mechanism will be described hereinbelow.

Diopter movement or adjustment is performed by letting out or in only the right objective lens 14a of FIG. 6.

When turning the diopter knob 4, an objective screw 26 fitted to this diopter knob 4 through an oval shape portion in such a manner as to be able to rotate together with the knob 4 as a one-piece follows the rotation of the knob 4 and turns.

This objective screw 26 is a spindle-like member provided in an upper portion located nearly midway between the left and right lens-barrels 35a and 35b of this binocular telescope in such a manner as to be put between the upper cover 1 and the lower cover 2 in parallel with the optical axis.

A screw 26a is threaded on the peripheral surface of a tip portion of the objective screw 26 and is threaded into an arm portion 23b extending from the objective side face of a right arm member 23. Further, as a result of turning objective screw 26, the right arm member 23 is let out or in along the direction of the optical axis.

As shown in FIG. 9, a laterally elongated hole 23a extending in a direction perpendicular to the optical axis is bored in right arm member 23. A tip portion of a pin 28 pushed into the objective lens frame 13a engages elongated hole 23a.

Thereby, as the right arm member 23 is let out or in, the right objective lens frame 13a follows the movement of the right arm member 23 and moves in the direction of the optical axis. The diopter movement or adjustment is thus performed.

Next, the focusing adjustment mechanism will be described hereinbelow.

A distance adjusting cam 19 is fastened to the distance adjusting knob 3 with screws through the upper cover 1, so that the distance adjusting knob 3 and the distance adjusting cam 19 are integrally coupled with each other and rotate as one piece.

This distance adjusting cam 19 is a member in which a cam groove 19a is made. Further, a distance adjusting pin 25 crimped by a left arm member 22 is inserted into this cam groove 19a.

This left arm member 22 is attached to the objective screw 26 through an E-ring 29. Thereby, the left arm member 22 and the objective screw 26 move in the direction of the optical axis as one piece.

A diopter spring 24, through which the objective screw 26 inserted, is provided between the E-ring 29 of the left arm member 22 and the arm portion 23b of the right arm member 23. Thereby, the distance, measured in the direction of the optical axis between the left arm member 22 and the right arm member 23, is always maintained at a constant value.

Similarly as in the case of the left arm member 23, an arm portion is protruded from the side of this right arm member 22 and a laterally elongated hole 22a is bored therein in a direction perpendicular to the optical axis. The pin 28 pushed into the objective lens frame 13b engages with elongated hole 22a.

When the distance adjusting knob 3 of FIG. 8 is turned in such a configuration, the distance adjusting cam 19 and the knob 3 turn as one piece. Thus, the left arm member 22 follows the rotation of this distance adjusting cam 19 and starts moving in the direction of the optical axis.

When the left arm member 22 starts moving in this way, the objective screw 26 attached to this left arm member 22 through the E-ring 29 starts moving simultaneously. Moreover, the objective screw 26 and the right arm member 23 start moving in the same direction as the direction in which the left arm member 22 moves.

In this manner, the left arm member 22 and the right arm member 23 move in the same direction as one piece. Thereby, the objective lens frames 13a and 13b respectively holding the objective lenses 14a and 14b follow the movement of the arm members 22, 23 and move in the direction of the optical axis. Thus, these frames 13a, 13b are simultaneously let out or in by the same length. Namely, the focusing adjustment is performed.

Next, the interpupillary distance adjusting mechanism will be described hereinbelow by referring to FIGS. 8 to 12.

As illustrated in FIG. 8, the interpupillary distance adjustment is performed by turning the interpupillary distance adjusting knob 5 serving as an operating member to thereby change the distance between the left and right lens-barrels 35a and 35b.

This interpupillary distance adjusting knob 5 is fastened through the lower cover 2 to the interpupillary distance adjusting cam 20, serving as an adjusting member, with screws, so that the knob 5 and the cam 20 rotate as one piece.

Figure 10:
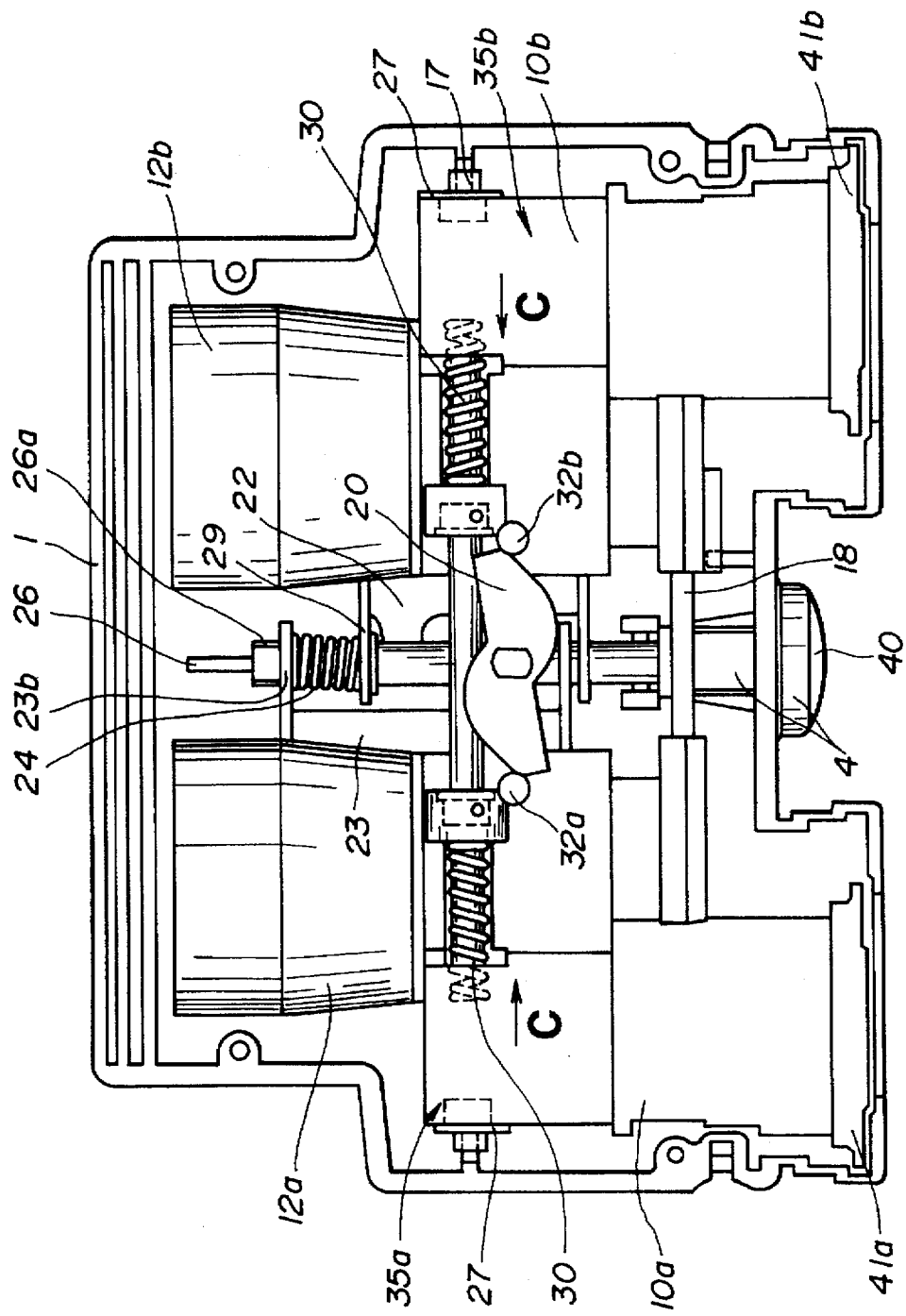
FIG. 10 is a bottom view of an internal structure of the binocular telescope, which is shown by removing a lower cover serving as an armoring member thereof.
Figure 11:
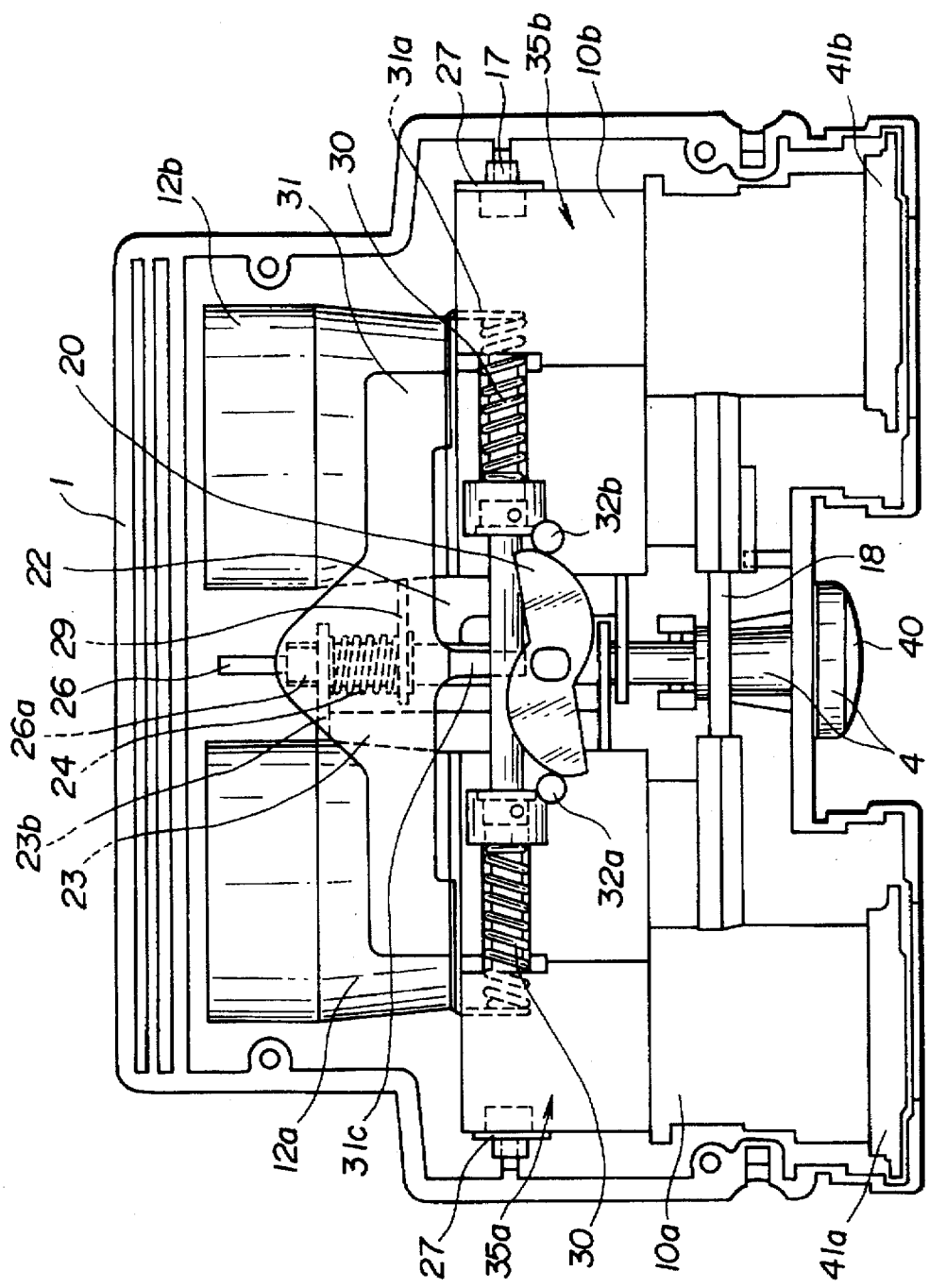
FIG. 11 is a bottom view of the binocular telescope of FIG. 10 to which a spring hanger is attached.

As illustrated in FIGS. 10 and 11, this interpupillary distance adjusting cam 20 is placed at a position in such a manner that the center of rotation of the cam 20 is located in the vicinity of the first guide shaft 17. The cam 20 has a cam face formed in such a manner as to be almost symmetric with respect to the center of rotation thereof. Cam-follower pins 32a and 32b respectively protruded from the lens-barrel body portions 10a and 10b are brought into abutting engagement with this cam face.

Interpupillary distance adjusting springs 30, each of which is constituted by a coiled spring or the like and serves as a pushing member, is pierced through by the first guide shaft 17 in the proximity of the side of each of the cam-follower pins 32a and 32b. An end portion of each of the interpupillary distance adjusting springs 30 at the side of the central portion of the binocular telescope engages with a projection portion protruded from the corresponding one of the lens-barrel body portions 10a and 10b. The opposite end portion of each of the interpupillary distance adjusting springs 30 at the side of the binocular telescope engages with and is attached to a spring hanger 31 of FIG. 11.

Thereby, the lens-barrel body portions 10a and 10b are pushed by the interpupillary distance adjusting springs 30 in the direction of an associated arrow C of FIG. 10 in such a manner that the cam-follower pins 32a and 32b are always put into abutting engagement with the interpupillary distance adjusting cam 20.

Figure 12:
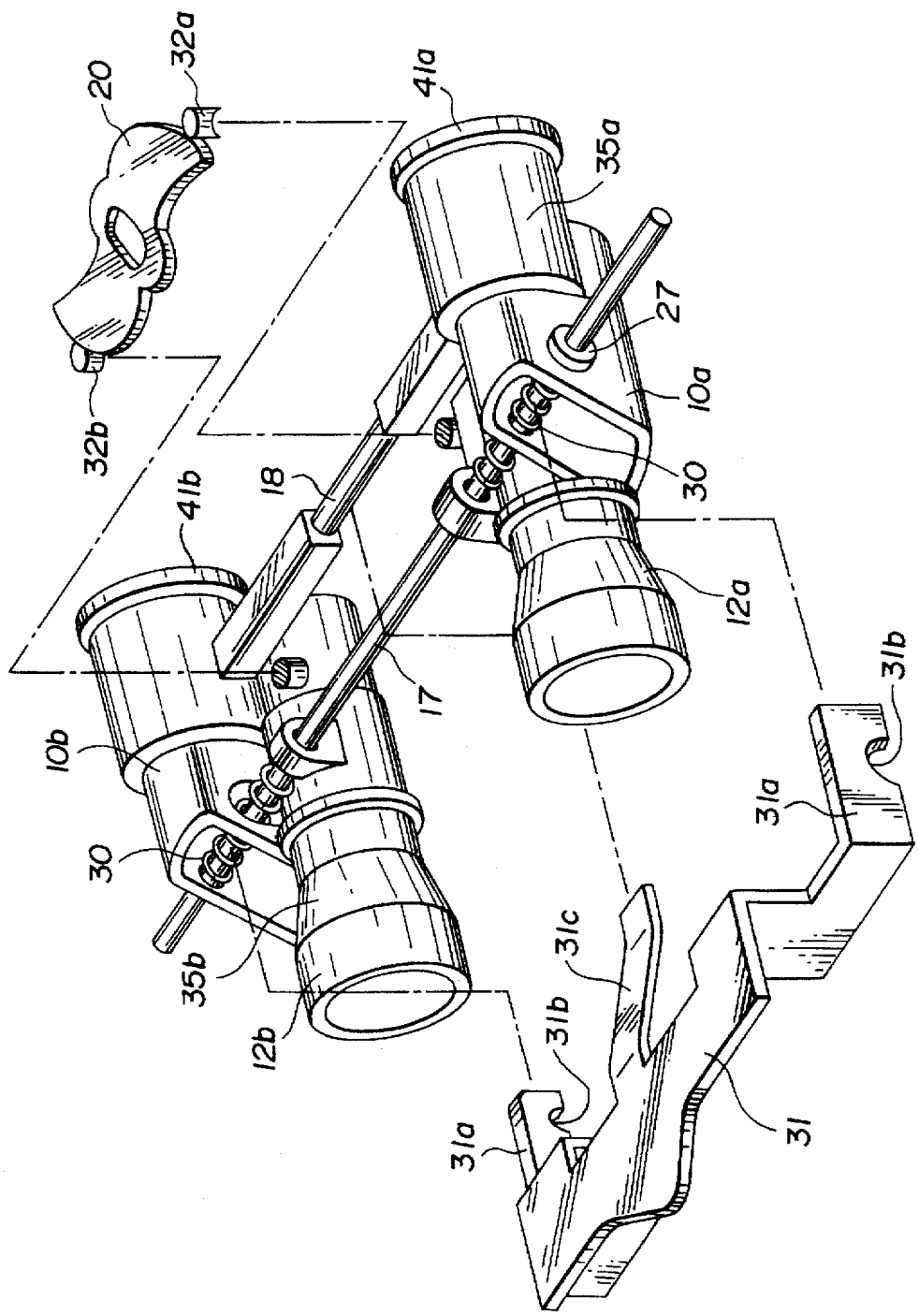
FIG. 12 is an exploded perspective view of the binocular telescope embodying the present invention, which illustrates a method of incorporating the spring hanger into the binocular telescope.

Spring hanger 31 has an arm portion 31a which engages with and catches the corresponding interpupillary distance adjusting spring 30 and extends from each end portion thereof as illustrated in FIG. 12. Further, a recess portion 31b engaging with the first guide shaft 17 is formed in a tip end portion of each of the arm portions 31a. Moreover, another arm portion 31c extends from a part between the arm portions 31a.

Thereby, the lens-barrel body portions 10a and 10b are always pushed by the interpupillary distance adjusting springs 30, respectively, in the (opposite) directions in which the portions 10a and 10b come nearer to each other. Moreover, the lens-barrel body portions 10a and 10b undergo a pushing force exerted by the interpupillary distance adjusting cam 20 in a direction which intersects with the guiding direction of the first guide shaft 17. Further, when the interpupillary distance adjusting cam 20 rotates, the lens-barrel body portions 10a and 10b are moved by the cam-follower pins 32a and 32b put into abutting engagement with the cam face of the cam 20 in such a manner as to follow the motion of the cam 20.

At that time, the lens-barrels 35a and 35b respectively containing the lens-barrel body portions 10a and 10b are slidably held by the two guide shafts, namely, by the first guide shaft 17 and the second guide shaft 18, respectively, as described above. Thus, the lens-barrels 35a and 35b are moved by the rotation of the interpupillary distance adjusting cam 20 in the directions in which these lens-barrels come away from or nearer to each other.

Further, as illustrated in FIG. 9, the elongated hole 22a bored in the left arm member 22 and the elongated hole 23a bored in the right arm member 23 are laterally elongated in the direction vertical to the optical axis. Thus the diopter and the position of the objective lenses at the time of achieving the focusing do not change even if the objective lens frames 13a and 13b, into which the pins 28 engaging with these elongated holes 22a and 23a are respectively pushed, move laterally by sliding and the interpupillary distance is changed by means of the interpupillary distance adjusting cam 20.

The interpupillary distance adjustment can be achieved in this way. Some clearance, however, is usually present between the sleeve 27 and the first guide shaft 17.

Thus, there is a possibility that the lens-barrel body portions 10a and 10b are inclined according to the position of the pushing means at the time of adjusting the interpupillary distance and further, the parallelism between the left and right lens-barrels 35a and 35b is lost or deteriorated and consequently, variations in the optical axes occur. However, as illustrated in FIG. 12, the lens-barrel body portions 10a and 10b undergo the pushing force, which is exerted by the first guide shaft 17 and the interpupillary distance adjusting springs 30 mounted thereon, through the cam face of the interpupillary distance adjusting cam 20. Consequently, the lens-barrel body portions 10a and 10b are urged in directions perpendicular to the guiding direction of the first guide shaft 17, respectively. This eliminates a possibility that any backlash is produced between the first guide shaft 17 and each of the lens-barrel body portions 10a and 10b.

More particularly, in the case where the interpupillary distance adjusting cam 20 has a shape of FIG. 10, in a plane parallel to the plane containing the pair of the left and right optical axes, the lens-barrel 35a undergoes the pushing force including a force exerted to the front of the optical axis. On the other hand, in the same plane, the lens-barrel 35b undergoes the pushing force including a force exerted to the rear of the optical axis.

Thereby, the parallelism between the optical axes is substantially maintained. Moreover, the directions to which the lens-barrel body portions are put are always fixed independently of the adjusted interpupillary distance, namely, irrespective of the amount or angle of rotation of the interpupillary distance adjusting cam 20.

Thus, the lens-barrel body portions 10a and 10b can always maintain parallelism between the optical axes when adjusting the interpupillary distance. Consequently, a change in direction of the optical axes never occurs.

Figure 13:
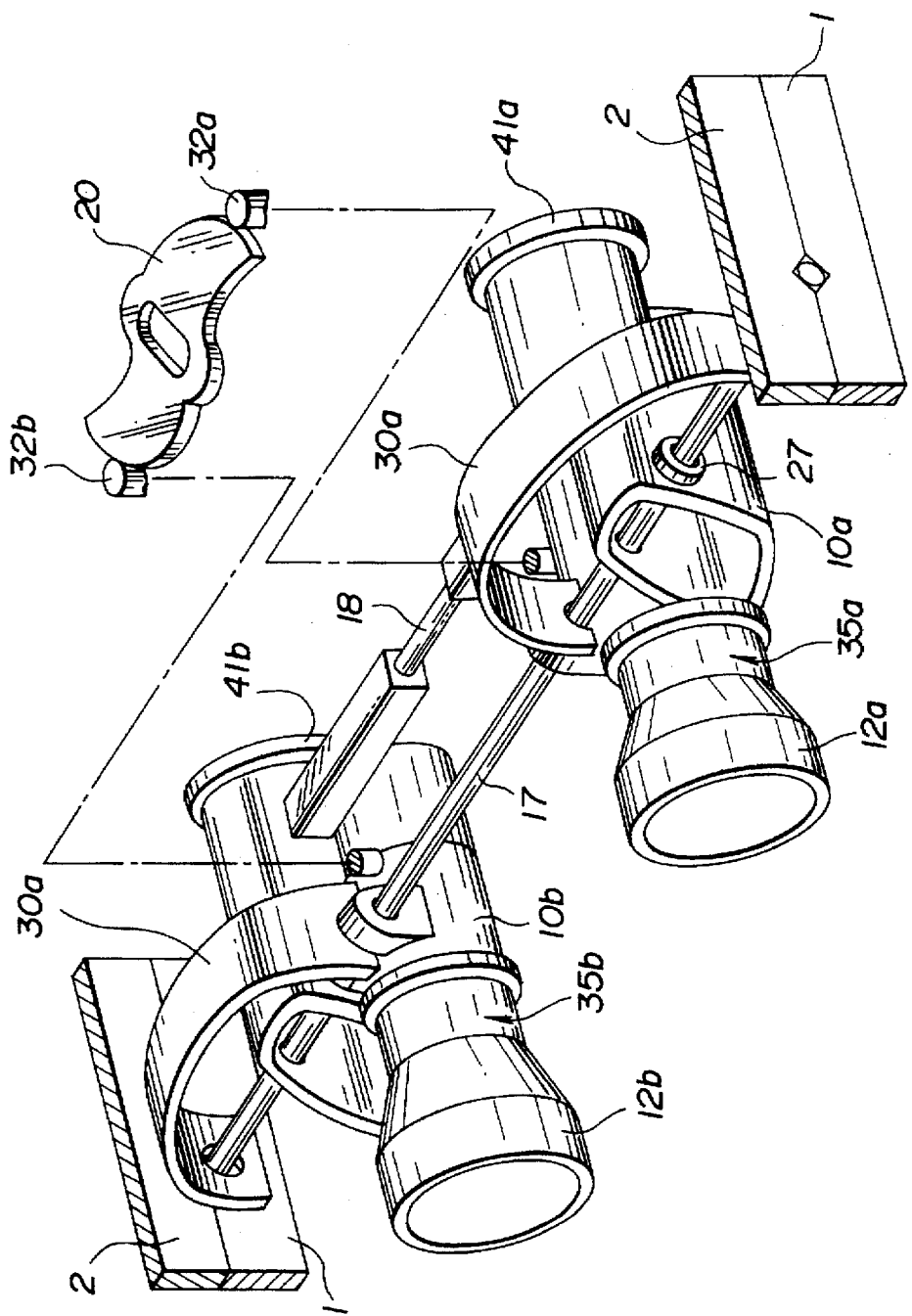
FIG. 13 is an exploded perspective view of the binocular telescope embodying the present invention in the case where a pushing member is changed from a coiled spring into a plate spring.

Incidentally, the pushing member for eliminating such a backlash is not limited to a coiled spring such as the interpupillary distance adjusting spring 30. As illustrated in FIG. 13, a plate spring 30a made of a metal, a resin or the like may be used as the pushing member. Further, any other elastic means, which have necessary functions and can be contained in the mechanism, may be used as the pushing means.

Furthermore, the cam acting as an example of the adjusting member is not limited to the rotary type cam. For example, a triangular cam, which can slide in the direction of the optical axis, may be used as the adjusting member.

Figure 14:
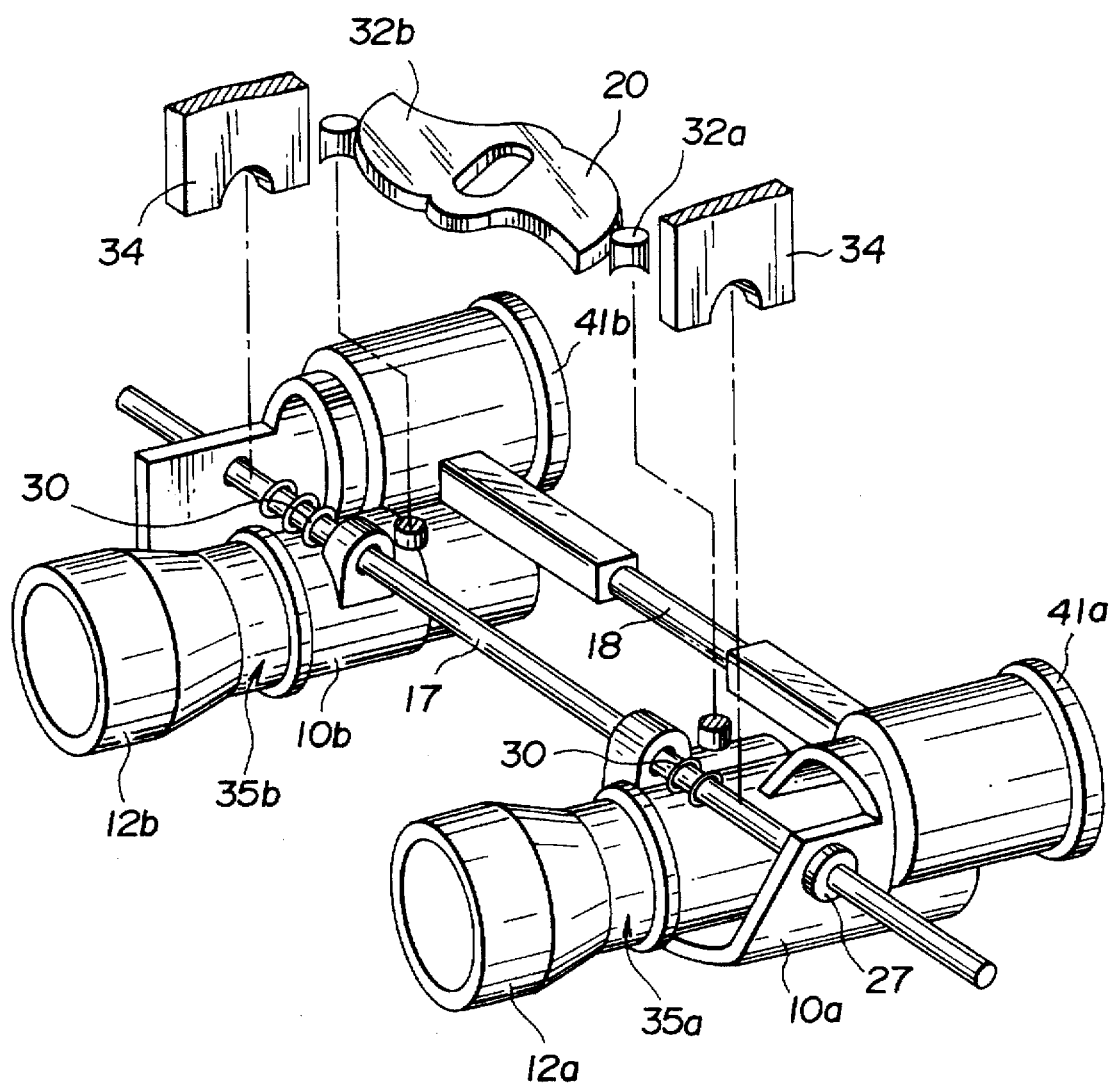
FIG. 14 is an exploded perspective view of the binocular telescope embodying the present invention in the case where the spring hanger is integrally-molded from the lower cover.

Additionally, a spring hanger portion 34 of FIG. 14 and the lower cover 2 may be integrally molded by removing the spring hanger 31 from the mechanism.

Incidentally, it is apparent that the aforementioned interpupillary distance adjusting mechanism for use in the binocular telescope can be applied not only to the case where both of the pair of the lens-barrels 35a and 35b are moved but also to the case where one of these lens-barrels is fixed and the other of these lens-barrels is moved with respect to the fixed lens-barrel.

As described above, in the case of such an embodiment of the present invention, the entire lens-barrels are always pushed in a fixed direction. Therefore, even if there is clearance between the guide axis and the fitting portion of the lens-barrel, the lens-barrel can touch the guide shaft and the lens-barrel can come in contact with the interpupillary distance adjusting mechanism by simultaneously maintaining the predetermined positional relation. Consequently, even when adjusting the interpupillary distance, the parallelism between the left and right optical axes never changes.

Additionally, simultaneously with this, the point of application of the force of the pushing member becomes located in the vicinity of the guide member by placing the pushing member in the neighborhood of the interpupillary distance mechanism. Thereby, the influence of the pushing force can be suppressed as much as possible during adjusting the interpupillary distance. Deformation or distortion of the frame of the lens-barrel due to the pushing force of the pushing member can be reduced or prevented. Changes in parallelism between the left and right optical axes owing to the deformation of the lens-barrel can be suppressed. This has a profound effect, especially, in the case where the lens-barrels are made of a material such as a resin, which can easily deform.

Although the preferred embodiment of the present invention has been described above, it should be understood that the present invention is not limited thereto and that other modifications will be apparent to those skilled in the art without departing from the spirit of the invention.

The scope of the present invention, therefore, is to be determined solely by the appended claims.

What is claimed is:

1. An interpupillary distance adjusting mechanism for use in a binocular telescope having a pair of lens-barrels having their optical axes disposed in parallel with each other, comprising:

guide shaft means for guiding the pair of lens-barrels to slide along a path transverse to said optical axes selective to move the pair of lens-barrels or apart closer together;

pushing means for exerting pushing forces on the pair of lens-barrels from directions of axes of the guide shaft means; and interpupillary distance adjusting means for converting a part of the pushing force acting on the pair of lens-barrels into a force component acting in a direction in which each of the pair of lens-barrels is pushed against the guide shaft means, while moving each of the pair of lens-barrels in directions, in which the pair of lens-barrels move away from or nearer to each other, by simultaneously pushing each of the pair of lens-barrels against the guide shaft means.

2. The interpupillary distance adjusting mechanism according to claim 1, which comprises at least two guide shaft means parallel to each other, wherein the pushing means is provided in one of the guide shaft means.

3. The interpupillary distance adjusting mechanism according to claim 1, wherein each of the pair of lens-barrels has a fitting portion fitted into the guide shaft means.

4. The interpupillary distance adjusting mechanism according to claim 1, wherein each of the lens-barrels has a projection portion provided on a peripheral surface thereof, wherein the interpupillary distance adjusting means converts a part of the pushing force undergone through the projection portion into the force acting in the direction in which each of the pair of lens-barrels is pushed against the guide shaft means.

5. The interpupillary distance adjusting mechanism according to claim 1, wherein the pushing forces of the pushing means are set in such a manner that acting directions, in which the pushing forces of the pushing means act, respectively, are opposite to one another and that the pushing forces of the pushing means have strengths, which are nearly equal to one another, respectively.

6. An interpupillary distance adjusting mechanism for use in a binocular telescope having a pair of lens-barrels disposed in parallel with each other, comprising:

guide shaft means for guiding the pair of lens-barrels to slide in directions in which the pair of lens-barrels move away from or nearer to each other;

pushing means provided on an axis of the guide shaft means for exerting pushing forces urging said pair of lens barrels toward one another; and interpupillary distance adjusting means for converting a part of the pushing forces acting on the pair of lens-barrels into a force component acting in a direction in which each of the pair of lens-barrels is pushed against the guide shaft means, while moving each of the pair of lens-barrels in a direction, in which the pair of lens-barrels move away from or nearer to each other, by simultaneously pushing each of the pair of lens-barrels against the guide shaft means.

7. The interpupillary distance adjusting mechanism according to claim 6, wherein each of the pair of lens-barrels has a projection portion, wherein the interpupillary distance adjusting means is rotatably mounted on a body of the binocular telescope, wherein the interpupillary distance adjusting means has a pair of cams, each of which comes in contact with the projection portion of each of the pair of lens-barrels, wherein the pair of cams slidably contact the projection portions and convert a part of the pushing force undergone through the projection portion into a force in a direction in which each of the pair of lens-barrels is pushed against the guide shaft means.

8. The interpupillary distance adjusting mechanism according to claim 6, wherein the pushing means are provided in such a manner that acting directions, in which the pushing force components of the pushing means act, respectively, are opposite to one another and that the pushing force components of the pushing means have strengths, which are nearly equal to one another, respectively.

9. A binocular telescope comprising:

a first lens-barrel containing a first optical system; a second lens-barrel containing a second optical system disposed in such a manner that an optical axis of the second optical system is parallel to an optical axis of the first optical system;

supporting means, aligned in a direction substantially perpendicular to the optical axes of the first and second optical systems, for guiding the first and second lens-barrels in such a manner as to be able to slide in directions in which the first and second lens-barrels move away from or nearer to each other;

a first pushing means provided in the supporting means, normally urging the first lens-barrel toward the second lens-barrel;

a second pushing means, provided in the supporting means, for normally urging the second lens-barrel toward the first lens-barrel; and an interpupillary distance adjusting member rotatably mounted on the body of the binocular telescope, the interpupillary distance adjusting member having a pair of cam means, each of which undergo pushing forces exerted from the first and second pushing means through the first and second lens-barrels, respectively, the interpupillary distance adjusting member converting a part of the pushing forces into force components which push the first and second lens-barrels against the supporting means, while the lens-barrels are moved, by the adjustment member, in directions, in which the lens-barrels move away from or nearer to each other, by being pushed against the supporting means.

10. A binocular telescope according to claim 9, wherein said first and second lens barrels contain optical means movable along their respective optical axes;

distance adjusting means for simultaneously moving said movable optical means in said first and second lens barrels to adjust for distance; and said distance adjustment means including coupling means coupled to said movable optical means to permit movement of the first and second lens barrels by said interpupillary distance adjusting member independently of said movement of said first and second movable optical means by said distance adjustment means.

11. A binocular telescope according to claim 10 wherein said coupling means comprises coupling members each having an elongated slot aligned parallel to said supporting means and a pair of pins each slidably arranged in one of said slots;

said pins each being joined to one of said axially movable optical means and said distance adjustment means and said coupling members being coupled to another whereby movement of the first and second lens barrels in a direction perpendicular to said optical axes independent of the distance adjustment means is obtained due to sliding of each pin within its associated elongated slot, said pins moving said movable optical means when said coupling means are moved by said distance adjusting means independent of movement of the lens barrels in the direction perpendicular to said optical axes.

12. A binocular telescope comprising:

a pair of lens-barrels disposed in parallel with each other, which contain lens optical systems, respectively;

a guide member for guiding the pair of lens-barrels to slide along a path substantially perpendicular to optical axes of the lens optical systems;

a pushing member for normally urging the pair of lens-barrels toward one another;

an adjusting member slidably engaging the lens barrels for adjusting a separation distance between the pair of lens-barrels by moving the pair of lens-barrels apart against a force exerted by the pushing means, said adjusting member converting a part of the pushing force into a force component acting in a direction transverse to the sliding direction to aid in maintaining parallel alignment of the lens barrels, said force component maintaining the pair of lens-barrels in sliding contact with the guide member.

13. A binocular telescope comprising:

first and second lens-barrels disposed in parallel with each other, which contain lens optical systems, respectively;

a guide member for guiding the first lens barrel to slide in a direction which intersects substantially perpendicularly to directions of optical axes of the lens optical systems;

a pushing member for pushing the first lens barrel in the sliding direction toward the second lens barrel;

an adjusting member slidably engaging the first and second lens barrels for adjusting a distance between the first and second lens barrels by urging the first lens barrel along the guide member against a pushing force exerted by the pushing means through the first lens barrel, said adjusting member converting the pushing force into a force component acting in a direction intersecting the sliding direction of the first lens barrel, whereby first lens barrel is pushed against the guide member by said force component as the first lens barrel is moved.

14. The binocular telescope according to claim 12, wherein the adjusting member is a rotatable cam, wherein a center of rotation of the rotatable cam is located in a vicinity of the guide member.

15. The binocular telescope according to claim 12 or 14, wherein the pushing member is disposed in a vicinity of the adjusting member.

16. The binocular telescope according to claim 12 or 13, wherein the pushing member is an elastic body.

17. The binocular telescope according to claim 16, wherein the elastic body is a coiled spring.

18. The binocular telescope according to claim 16, wherein the elastic body is a plate spring.

19. The binocular telescope according to claim 18, wherein the plate spring is made of a metal.

20. The binocular telescope according to claim 18, wherein the plate spring is made of a resin.

21. The binocular telescope according to claim 12 or 13, wherein the lens-barrels are made of a metal.

22. The binocular telescope according to claim 12 or 13, wherein the lens-barrels are made of a resin.

23. A binocular telescope comprising:

a pair of lens-barrels, through which an object is observed, the pair of lens-barrels respectively having optical axes parallel to each other;

a guide shaft aligned perpendicular to the two optical axes, the pair of lens-barrels being guided along the guide shaft;

a pushing member, provided on the guide shaft, exerting a force for pushing the pair of lens-barrels in directions in which the pair of lens-barrel move nearer to each other; and an interpupillary distance adjusting member engaging said lens barrels for adjusting a distance at which the pair of lens-barrels are spaced apart from each other against the force of the pushing member acting on said lens barrels.

24. The binocular telescope according to claim 23, wherein the interpupillary distance adjusting member is a cam means.

25. The binocular telescope according to claim 23, which further comprises a pushing support member, wherein the pushing support member supports an end of the pushing member, wherein another end of the pushing member engages the pair of lens-barrels.

26. The binocular telescope according to claim 23, wherein the interpupillary distance adjusting member is provided in a vicinity of the guide shaft.

27. A binocular telescope comprising:

a pair of observation optical systems, through which an object is observed, the pair of observation optical systems respectively having optical axes parallel to each other;

guide means aligned perpendicular to the two optical axes, the pair of observation optical systems being guided along the guide means;

pushing means, provided on the guide means, provide forces for pushing the pair of observation optical systems in directions in which the pair of observation optical systems move nearer to each other; and interpupillary distance adjusting means engaging the observation optical systems for adjusting a distance at which the pair of observation optical systems are spaced apart from each other against the forces of the pushing means acting on the optical systems.

28. The binocular telescope according to claim 27, wherein the interpupillary distance adjusting means is constituted by cam means.

29. The binocular telescope according to claim 27, wherein the pushing means further comprises a spring member and a pushing support member, wherein the pushing support member supports an end of the spring member, wherein another end of the spring member pushes against the pair of observation optical systems.

30. The binocular telescope according to claim 27, wherein the interpupillary distance adjusting means is provided in a vicinity of the guide means.

31. A binocular telescope comprising:

a pair of lens barrels respectively containing a pair of observation optical systems, the pair of observation optical systems respectively having a pair of optical axes parallel to each other;

guide means for guiding the pair of lens barrels in a direction substantially perpendicular to the pair of optical axes;

pushing means exerting forces for pushing the pair of lens barrels toward one another along the guide means; and adjusting means engaging the lens barrels for adjusting a distance between the pair of optical axes, the adjusting means converting a pushing force of the pushing means into a force component exerted in a predetermined direction intersecting the guiding direction and pushing the pair of lens barrels against the guide means in a plane parallel to a plane containing the pair of optical axes.

32. The binocular telescope according to claim 31, wherein the distance adjusting means comprises cam means.

33. The binocular telescope according to claim 32, wherein the pushing force of the pushing means is converted by the cam means into a first force containing a component which is directed in a first direction along the optical axes, wherein the first force obtained as a result of converting the pushing force is applied to one of the lens-barrels, and wherein the pushing force of the pushing means is converted by the cam means into a second force containing the component force which is directed in a second direction along the optical axes and opposite said first direction, and wherein the second force obtained as a result of converting the pushing force is applied to another of the lens-barrels.

34. The binocular telescope according to claim 32 or 33, wherein the cam means is disposed at a position midway between the pair of lens-barrels, wherein the pushing means pushes the pair of lens-barrels in directions in which the pair of lens-barrels come nearer to each other.

35. The binocular telescope according to claim 31, wherein the pushing means is placed in a vicinity of the guide means.

36. The binocular telescope according to claim 31, wherein the guide means is a guide shaft, wherein the pushing means is a coiled spring, wherein the coiled spring is placed concentrically with the guide shaft.

37. A binocular telescope comprising:

a pair of observation optical systems, through which an object is observed, the pair of observation optical systems respectively having optical axes parallel to each other;

guide means containing a single guide shaft, the optical axes of the pair of observation optical systems being maintained in parallel with each other by the single guide shaft, the pair of observation lens systems being guided along the guide means;

interpupillary distance adjusting means for adjusting relative positions of the pair of observation optical systems;

driven means provided on said pair of observation optical systems at positions near said guide shaft, the driven means engaging the adjusting means and being moved by the interpupillary distance adjusting means;

pushing means, provided along the guide shaft, for holding the relative positions of the pair of the observation optical systems and for maintaining the interpupillary distance adjusting means in abutting engagement with the driven means, whereby the interpupillary distance adjusting means adjusts a relative distance between the pair of observation optical systems against a force exerted by the pushing means upon the observation optical systems.

38. An interpupillary distance adjusting mechanism for use in a binocular telescope, comprising:

a pair of lens-barrels, through which an object is observed, the pair of lens-barrels respectively having a pair of optical axes parallel to each other;

guide means for guiding the pair of lens-barrels in a direction perpendicular to the pair of optical axes;

pushing means, disposed in a vicinity of the guide means, exerting a force for pushing the pair of lens-barrels along the guide means in directions in which the pair of lens-barrels are made to move nearer to each other; and cam means engaging the lens barrels for adjusting an interpupillary distance by spacing the pair of lens-barrels apart from each other against the pushing force of the pushing means, wherein a change in the deformation of the pair of lens-barrels due to a variation in pushing force of the pushing means, which is caused by adjusting the interpupillary distance by means of the cam means, is substantially negligible.

* * * * *

UNITED STATES PATENT AND TRADEMARK OFFICE
CERTIFICATE OF CORRECTION

PATENT NO. : 5,734,499
DATED : March 31, 1998
INVENTOR(S) : Matsumoto et al.

It is certified that error appears in the above-identified patent and that said Letters Patent is hereby corrected as shown below:

On the title page, Column 1, line 1,

IN THE TITLE: "Telescope" should be --Telescopes--.

Col. 1, line 16, insert "," after "distance".

Col. 2, line 11, after the first occurrence of "distance" insert --so--.

Col. 2, line 11, after "that" insert --,--.

Col. 2, line 11, after second occurrence of "distance" delete --so--.

Col. 5, line 32, after "objective" insert --lens portions 12a, 12b--.

Col. 5, line 46, after "cover 1" insert --(see Fig. 10)--.

Signed and Sealed this

Eleventh Day of May, 1999

Attest:

Q. TODD DICKINSON

Attesting Officer

Acting Commissioner of Patents and Trademarks